US005268785A

United States Patent [19]

Crenshaw et al.

[11] Patent Number: 5,268,785
[45] Date of Patent: Dec. 7, 1993

[54] ALL-OPTICAL SWITCH UTILIZING INVERSION OF TWO-LEVEL SYSTEMS

[75] Inventors: Michael E. Crenshaw, Madison; Michael Scalora; Charles M. Bowden, both of Huntsville, all of Ala.

[73] Assignee: The United States of America as represented by the Secretary of the Army, Washington, D.C.

[21] Appl. No.: 14,605

[22] Filed: Feb. 8, 1993

[51] Int. Cl.[5] .............................................. G02F 1/015

[52] U.S. Cl. ..................................... 359/244; 257/184

[58] Field of Search .......................... 359/244; 372/11; 357/30, 37

[56] References Cited

U.S. PATENT DOCUMENTS

| | | | |
|---|---|---|---|
| 4,720,175 | 1/1988 | Haus et al. | 350/353 |
| 5,047,810 | 9/1991 | Chemla et al. | 357/30 |
| 5,119,227 | 6/1992 | Dawson et al. | 359/244 |

*Primary Examiner*—Mark Hellner
*Attorney, Agent, or Firm*—Freddie M. Bush; Hay Kyung Chang

[57] ABSTRACT

Described here is an all-optical switch having two states, one that absorbs incident coherent optical radiation and another that amplifies incident coherent optical radiation. The state of switch is changed in response to the passage of an ultra-short coherent optical pulse when the peak field strength of the pulse is in a wide region about the effective dipole moment per unit volume, a characteristic material parameter proportional to the density and the dipole transition moment of the selected active two-level systems which are uniformly distributed with sufficient density so that there is more than one two-level system per cubic transition wavelength causing dipole-dipole interactions to be non-negligible.

4 Claims, 10 Drawing Sheets

| Bias | Input A | Input B | Inversion |
|---|---|---|---|
| $\zeta-3\delta/4$ | 0 | 0 | −1 |
| $\zeta-3\delta/4$ | 0 | $\delta/2$ | 1 |
| $\zeta-3\delta/4$ | $\delta/2$ | 0 | 1 |
| $\zeta-3\delta/4$ | $\delta/2$ | $\delta/2$ | 1 |

Fig. 9

| Bias | Input A | Input B | Inversion |
|---|---|---|---|
| $\zeta-\delta/4$ | 0 | 0 | 1 |
| $\zeta-\delta/4$ | 0 | $\delta/2$ | 1 |
| $\zeta-\delta/4$ | $\delta/2$ | 0 | 1 |
| $\zeta-\delta/4$ | $\delta/2$ | $\delta/2$ | −1 |

Fig. 10

ALL-OPTICAL SWITCH UTILIZING INVERSION OF TWO-LEVEL SYSTEMS

DEDICATORY CLAUSE

The invention described herein may be manufactured, used, and licensed by or for the Government for governmental purposes without the payment to us of any royalties thereon.

BACKGROUND OF THE INVENTION

Optical computing and optical digital signal processing systems typically incorporate some form of optical switching alements. While hybrid electronic-Optical devices, such as Self Electro-optic Effect Devices (SEED) have been applied to optical digital processing, all-optical digital systems offer the possibility of very high integrity systems, wide bandwidth, high speed, bulk processing, and elimination of optical-to-electronic interfaces. One of the extant mechanisms for all-optical switching devices is the use of optical bistability, in which an illuminated device made with a nonlinear optical material can exhibit either of two constant light intensities as the output of the device for a given light intensity as the device input. Optical bistability is a steady-state effect which requires the input optical fields to be constant for a time period on the order of several induced dipole-dephasing times. The nonlinearity may be absorptive or dispersive and feedback is generally provided by locating the material in an optical cavity.

Another mechanism for accomplishing all-optical switching is the optical pumping of a population of effectively two-level systems from one level to the other level. In thermodynamic equilibrium, population in excited quantum-mechanical energy levels tends to drop to the lowest energy level that is available. Population can be pumped from lower energy levels to higher energy levels. The population then decays through the ladder of levels, by radiative or non-radiative transitions, to the lowest available energy level. While most levels quickly decay to lower-energy levels, there may be long-lived excited levels with lifetimes that are long compared to a time of interest, e.g., an optical pulse width. A population inversion exists when the population in an excited level is larger than the population in the lower level, or levels, to which it is coupled.

When other energy levels can be neglected, a long-lived level with a radiative transition to a long-lived, lower energy level can be modeled as a dipole-coupled, two-level, quantum mechanical system. In this model, the lower level iB typically called the ground state and the upper level is typically called the excited state, even though higher and lower energy levels may exist in the full ladder of levels from which the two-level system is extracted. Examples of such effectively two-level systems are electronic energy levels in atoms, vibrational energy levels in molecules and editions near the band edge in semiconductors.

In incoherent pumping, population is typically excited indirectly to a long-lived excited level, either by collisions or by excitation to short-lived levels which decay to a long-lived excited level. Lasing can occur when this metastable level has a radiative transition to a lower energy level and the population becomes inverted. The principal methods for incoherent pumping are electric discharge excitation and optical excitation with a flashlamp.

Coherent pumping directly excites a radiative transition between long-lived levels. An ultra-short coherent pulse, resonant with the transition frequency, fully inverts a collection of two-level systems when the pulse area is an odd multiple of u, where the pulse area is the time integral of the field strength, expressed in angular frequency units. In adiabatic inversion, the field strength is kept constant and the detuning from resonance is swept slowly through zero, inverting the population. However, these methods, based on noninteracting two-level systems, are not valid in dense media because they neglect the effect of dipole-dipole interactions which occur in dense collections of two-level systems.

SUMMARY OF THE INVENTION

An all-optical switch is revealed which has no hysteresis that is an undesirable yet common occurrence when utilizing bistability, and which is independent of dissipation from incoherent effects such as dephasing and spontaneous relaxation. The switch has two possible states, one that absorbs coherent optical radiation (i.e. ground state) and another that amplifies coherent optical radiation (i.e., excited state). In other words, the change in states affects the intensity of the incident radiation. The switch comprises a uniform distribution of effectively two-level systems and a source of transient, ultra-short, coherent optical pulse that is incident on the systems. It is required that the distribution be sufficiently dense that there is more than one two-level system per cubic transition wavelength such that dipole-dipole interactions are not negligible. The transition wavelength is defined by $(2\pi)(c)(\hbar)(n_o)$/difference between the energy levels, where $c$=speed of light in vacuum $\hbar$=Planck's Constant divided by $2\pi$, $n_o$=index of refraction of the host material.

If the two-level systems are not embedded in any host material, then the value of $n_o$ is 1.

It is also required that the optical pulse being emitted by the source be resonant or at least nearly resonant with the transition frequency of the two-level systems. The state of the switch changes from one to the other in response to the passage therethrough of the optical pulse when the peak field strength of the pulse is in a wide region about the effective dipole moment per unit volume, a characteristic material parameter proportional to the density and the dipole transition moment. As such, the switch is largely insensitive to perturbations in various parameters such as pulse width and pulse shape. Further, because the high density of the two-level systems allows for small device sizes, and the systems can be embedded in a linear or nonlinear host material, and because the performance of the switch can be manipulated by controlling the density of the two-level systems, the switch is well-suited for incorporation into optical wave-guiding structures optical integrated circuits.

DESCRIPTION OF THE DRAWINGS

FIG. 9 is a truth table for the logic gate operating as an OR logic gate.

FIG. 10 is a truth table for the gate operating as an NAND gate.

DESCRIPTION OF THE PREFERRED EMBODIMENT

Figure 1:
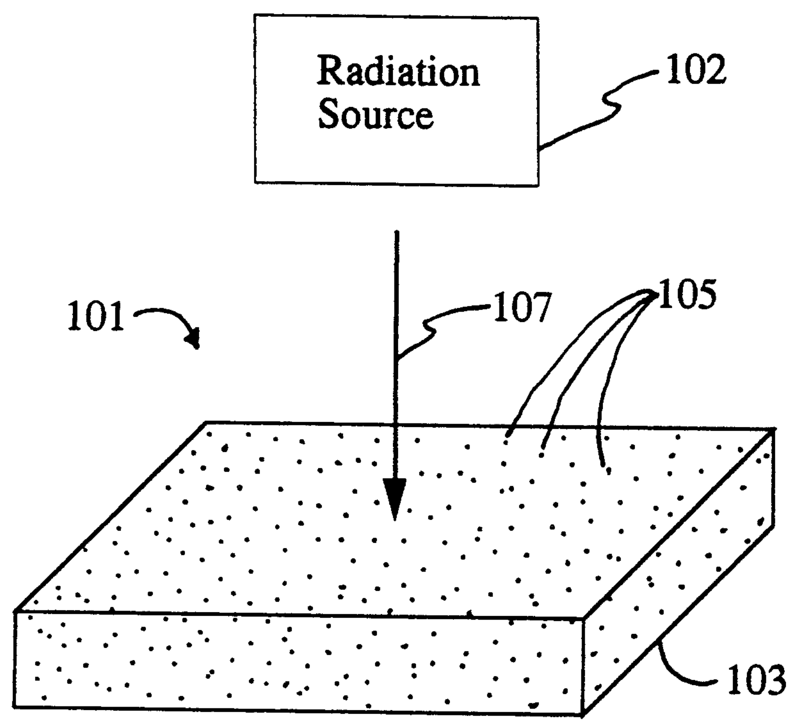
FIG. 1 is a diagram of the all-optical switch.

Turning now to figures wherein like numbers refer to like parts, FIG. 1 is a diagram of all-optical switch 101 which comprises a thin film of optical host material 103 throughout which is a uniform, dense distribution of effectively two-level systems 105 and radiation source 102 emitting radiation pulses having certain required traits as henceforth explained. It should be noted here that the use of host material is not essential for the operability of the switch. The following description of the function of the switch applies equally well to a sufficiently dense distribution of the two-level systems without embedment in a host material. However, if a film of host Material is used, then the film thickness in the direction of propagation of the incident radiation must be much smaller than a resonance wavelength of the radiation. Some examples of suitable two-level systems are electronic energy levels in atoms, vibrational energy levels in molecules and excitons near the band edge in semiconductors. In reality, of course, as is well-known, the above-named so-called "two-level" systems have multiple energy levels. However, for purposes of describing the all-optical switch, only two levels are extracted from the multiple levels, a low level called the ground state and a high level called the excited state. The required density for proper operation of the all-optical switch would depend on the particular type of the selected two-level systems, but should be at least $10^{16}$ two-level systems per $cm^3$ of Volume. Transient, ultrashort, coherent optical pulse 107, emanating from source 102, impinges on the collection of two-level systems 105 that are distributed within optical host material 103 densely enough that the near dipole-dipole interaction strength is greater than the inverse of the pulse width. The optical pulse which is resonant or at least nearly resonant with the transition frequency of the selected two-level systems transfers the systems from the initial state, whether it be the ground state or the excited state, to the other state when the peak field strength of the pulse is near the effective dipole moment per unit volume which is a characteristic material parameter. The characteristic material parameter can be described by $\mu=4\pi\zeta N/3L$ where $\mu$ is the parameter, g is the induced dipole moment of the transition between the two energy levels, N is the density of the two-level systems within host material 103 and L is the local field enhancement factor. L is further defined by $L=(n_o^2+2)/3$ where $n_o$ is the index of refraction of the host material.

Figure 2:
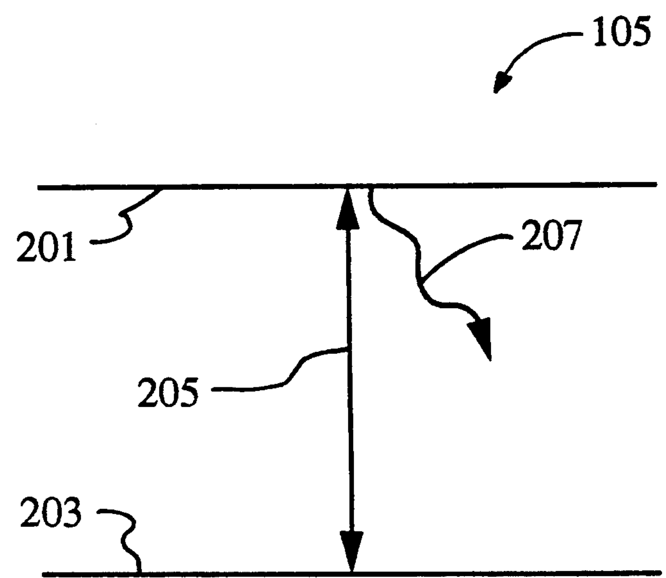
FIG. 2 illustrates the radiative transition of a typical two-energy-level system.

FIG. 2 is a schematic representation of a typical two-level system 105 and shows the system's excited state 201 and ground state 203 which are connected by dipole transition 205. Without any exterior influence, a natural population-decay process exists from the excited state to the ground state is indicated by arrow 207 and the ground state will remain in the ground state. However, this natural tendency can be changed by application of optical pulse 107 to two-level systems 105 distributed throughout host material 103. The optical pulse is transient, has a frequency which is resonant or at least nearly resonant with the transition frequency of the system and has a temporal duration that is short in comparison with the induced dipole dephasing time of the two-level systems but is greater than $3h/8\pi^2\mu^2N$ where h=Planck's constant, N=density of the two-level systems, and $\mu$=dipole moment of the transition between the two energy levels. After the pulse has passed through the material, the two-level systems are left in either the ground state or the excited state, depending on the initial state and the relationship between the peak field strength of the pulse and the characteristic material parameter, $\zeta=4\pi\mu N/3L$. A subsequent coherent optical pulse, which is like the preceding pulse, and incident on the optical material 103, will be absorbed or amplified, depending on the state of the two-level systems which was set by the preceding pulse.

Figure 3:
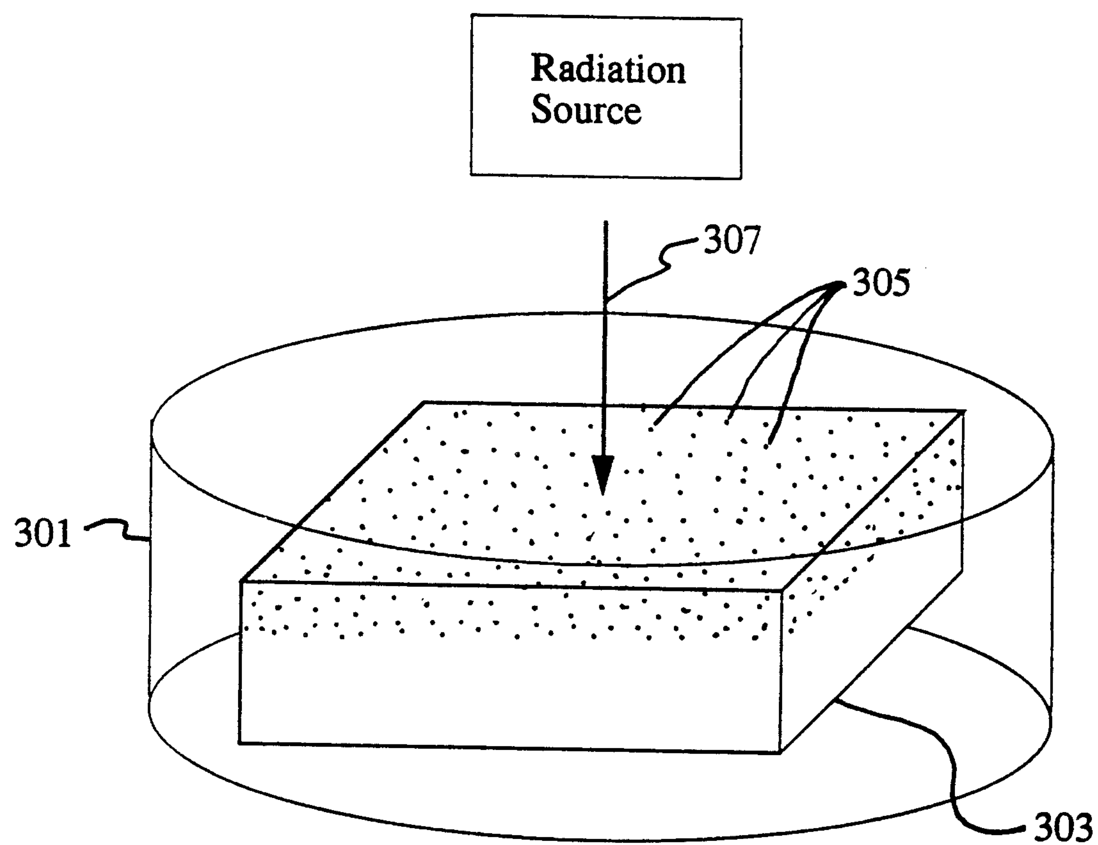
FIG. 3 is a diagram of all-optical switch which uses CdS as host material and $I_2$ bound editions as the two-energy-level systems.

FIG. 3 shows a diagram of an example of such an all-optical switch. It comprises thin platelet 303 of cadmium sulfide (CdS) which has been partially doped with iodine (I) 305, thereby creating a thin film containing 12 bound excitons in a host material of CdS. The film is mounted in cryogenic dewar 301 and illuminated by optical field 307 having a Gaussian temporal profile and a peak field strength of $4\pi\mu N/3L$, where $\mu$ is the dipole moment of an exciton, N is the density of excitons, L is the local field enhancement factor $(n_o^2+2)/3$, and $n_o$ is the index of refraction of the host material. The optical field has a wavelength near the 487 nanometer resonance line of the $I_2$ bound excitons. For an exciton density of $10^{17}\,cm^{-3}$, a dipole moment of 86 Debye, and a linear index of refraction of 3, the peak field strength of the optical field will be 9.8 statvolts per centimater and typical pulse widths are 10 picoseconds. For $I_2$ bound excitons that are prepared in the ground state, passage of the optical pulse results in complete inversion, fully converting all excitons to the excited state.

Figure 4:
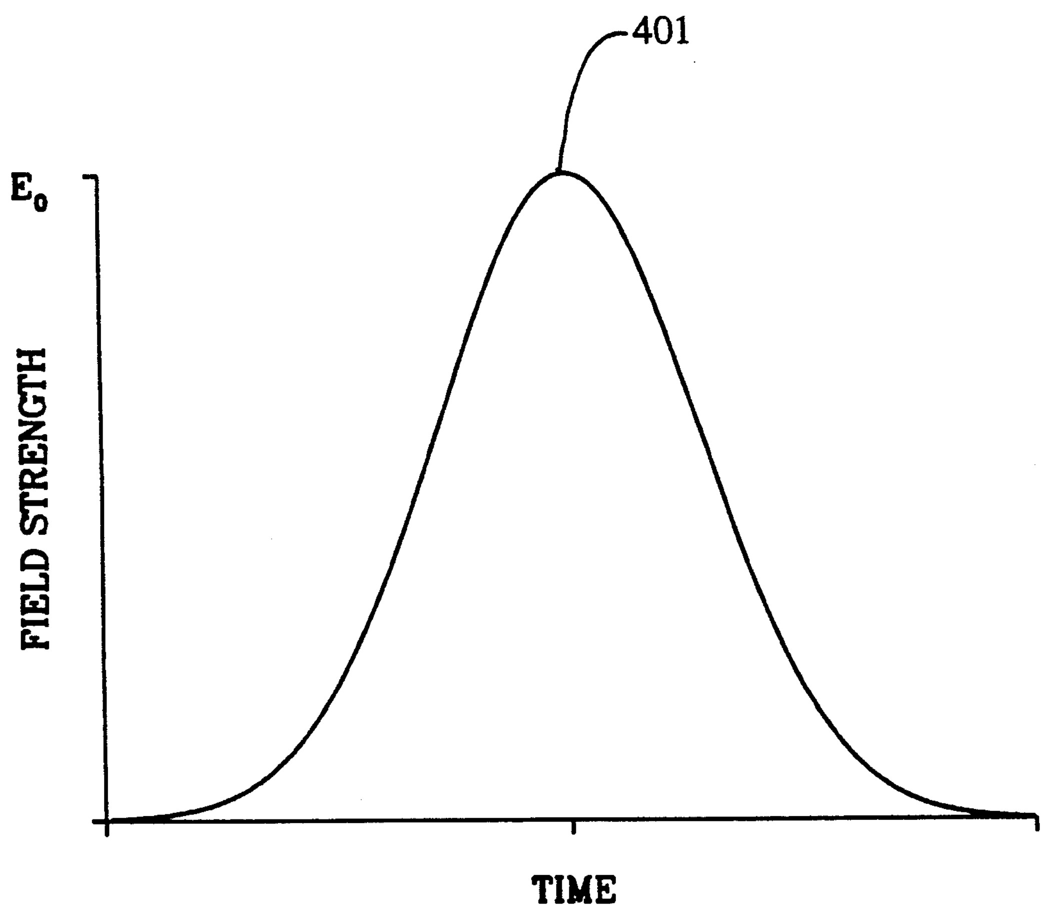
FIG. 4 is a graph showing the temporal evolution of pulse 107.

FIG. 4 shows a graph of the typical temporal evolution of pulse 107 and identifies the peak field strength at point 401. Optical material 103 responds to the optical pulse in accordance with a set of optical sloch equations, which have been extended to include near dipole-dipole interactions. For a collection of two-level systems 105 interacting, via an electric dipole transition 205, with an externally applied, classical, transient, coherent field $\frac{1}{2}[E(t)\exp(-\omega t)+c.c.]$, the optical Sloch equations in the slowly varying amplitude variables, in the rotating-wave approximation, and extended for interaction with near dipoles, take the form $$\frac{du}{dt'} = (\Delta - \epsilon w)\tau_p v - \frac{\tau_p}{T_2} u, \qquad (1)$$

$$\frac{dv}{dt'} = -(\Delta - \epsilon w)\tau_p u + \Omega\tau_p w - \frac{\tau_p}{T_2} v, \qquad (2)$$

and

-continued $$\frac{dw}{dt'} = -\Omega\tau_p v - \frac{\tau_p}{T_1}(w - w_o), \quad (3)$$

where $T_1$ is the natural population-decay time, $T_2$ is the induced dipole dephasing time and $\Delta=\omega-\omega_o$ is the detuning of the field carrier frequency from the transition frequency $\omega_o$. Differentiation is with respect to a dimensionless scaled time, $t'=t/\lambda_p$, where $t_p$ is the pulse width, which is much less than $T_1$ and $T_2$ so that damping is negligible. The strength of the near dipole-dipole interaction is given by $E=4\pi\mu^2N/3\pi$, which must be much less than. The transition frequency $\omega_o$ is the energy separation of the levels divided by $\hbar$, N is the density of two-level systems, $\hbar$ is Planck's constant divided by $2\pi$, and $\Omega=\mu LE(t)/\hbar$ is the instantaneous rapid frequency, where the field envelope E(t) varies slowly on the time scale of the period $2\pi/\omega$. Physically, u and v are the components of the polarization in-phase and in-quadrature with the exciting field and w is the inversion, representing the difference between the population in the excited state and in ground state. The initial state of the inversion so is $-1$ if the systems are prepared in the ground state and $+1$ if the systems are prepared in the excited state.

Figure 5:
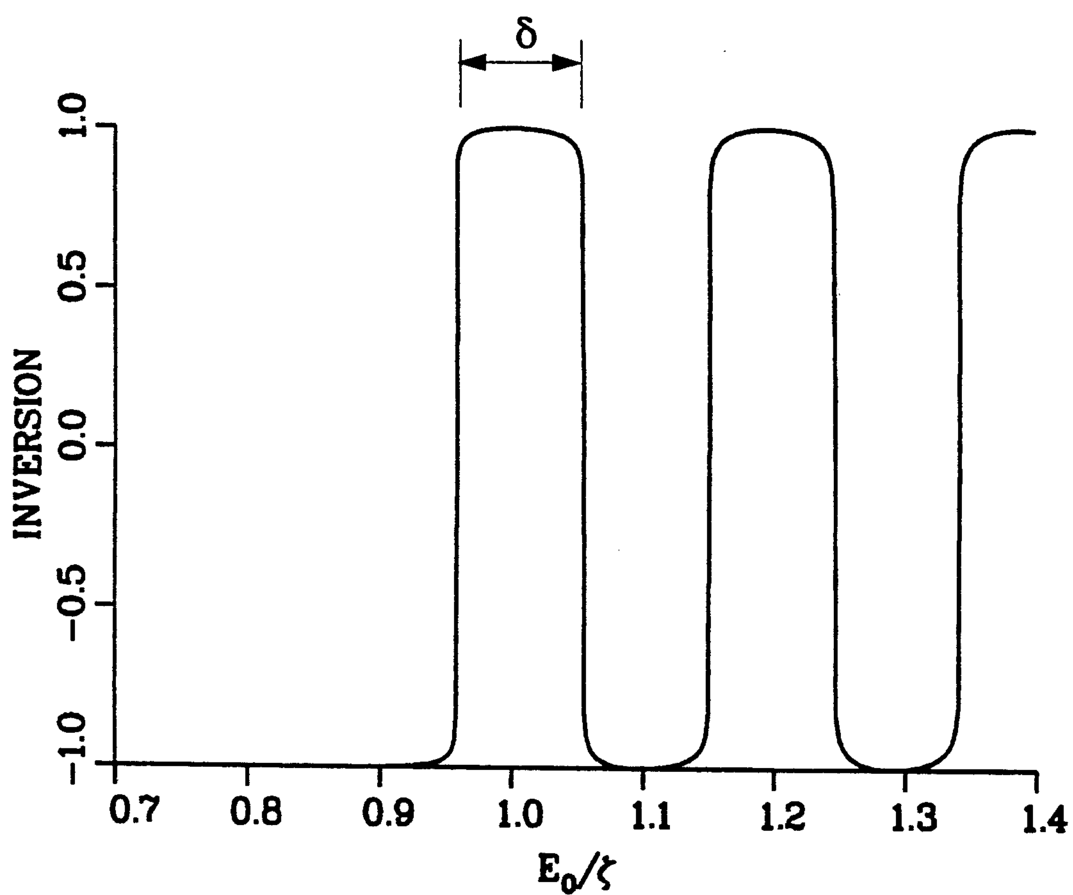
FIG. 5 graphically illustrates the inversion of two-level systems after a time-dependent field has passed through the systems which were initially prepared in the ground state.

For an optical pulse whose duration time is much shorter than a population-decay time, the inversion of the two-level systems that remains after an optical pulse has passed is constant. For two-level systems that are prepared in the ground state so$=-1$, the inversion that remains in the two-level systems after a time-dependent field has passed is depicted in FIG. 5 as a function of the ratio of the peak field strength $E_o$ to the characteristic material parameter $\zeta$ as the peak field strength is being varied. The graph is inverted if the two-level systems are prepared in the excited state. The most significant feature of FIG. 5 is the wide region of full inversion about $E_o/\zeta=1$. The width of the region depends on parameters such as the density of effectively two-level systems, the dipole transition moment, and the temporal evolution of the field, allowing the full-inversion region to be effectively engineered by manipulating the parameters. Because full inversion occurs when the peak field strength of the pulse is in a wide region about the effective dipole moment per unit volume, the all-optical switch is very tolerant of perturbations in the parameters. Typical perturbations that might occur are pulses with a spatial profile or which experience mild absorption, or varieties in the pulse width, pulse shape, dipole moment, or density which may not be known to a high degree of accuracy or may be difficult to control.

Figure 6:
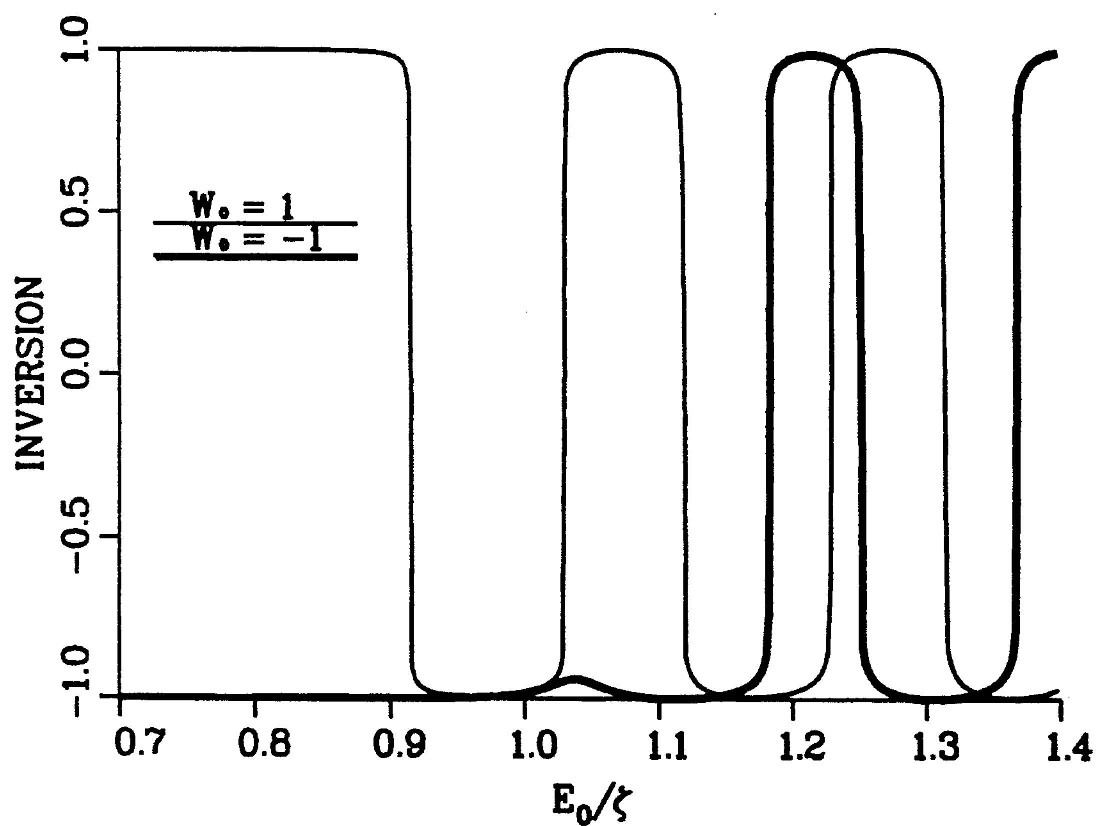
FIG. 6 is a graph showing the inversion of the systems resulting from positive detuning of pulse 107.
Figure 7:
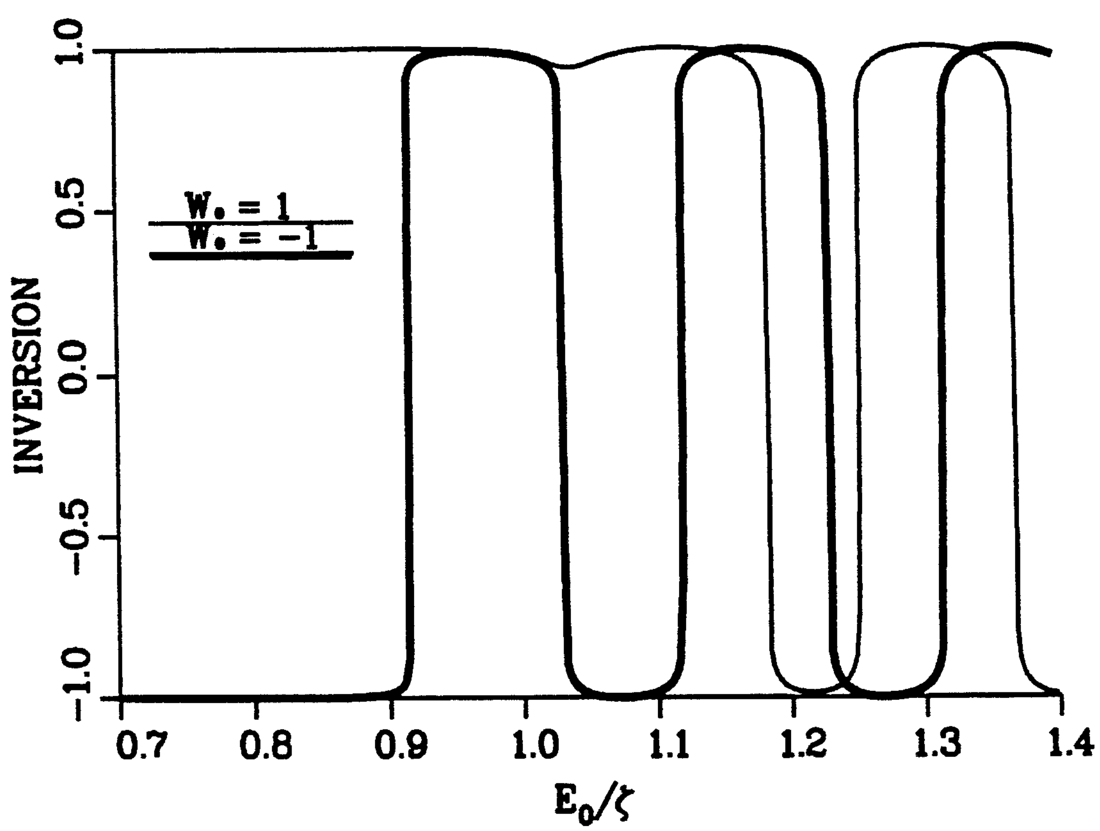
FIG. 7 graphically shows the inversion resulting from negative detuning of pulse 107.

If the incident optical field is exactly resonant with the transition frequency of the two-level systems, the results obtained for the inversion of a collection of the systems that are initially in the excited state, $w=+1$, are equivalent to the results obtained for a collection of the systems that are initially in the ground state, $w=-1$, except for the change of the sign in w. Therefore, a collection of the two-level systems in the excited state can be re-inverted by a pulse with $E_o/\zeta=1$, the normalized peak field strength returning the systems to the ground state. Detuning the applied field from resonance breaks this inversion symmetry. The final inversion as a function of $E_o/\zeta$, where the optical field frequency is detuned to the high frequency side of the transition frequency i.e. positive detuning, is shown in FIG. 6 for both ground state and excited state initial conditions. FIG. 7 shows the equivalent results with a negative detuning. FIG. 6 shows that, by positively detuning the field carrier frequency from resonance, it is possible to construct an ultrashort coherent optical pulse such that the systems will be left with an inversion near $-1$ after the pulse has passed, independent of whether the initial condition is the ground state or the excited state. Likewise, FIG. 7 shows that, with a negative detuning from resonance, it is possible to select a peak field strength such that the inversion is left near the excited state, again independent of whether the initial condition is the ground state or the excited state. Thusly, by detuning from resonance, the optical switching mechanism can be used as a bit in an optical memory register.

Figure 8:
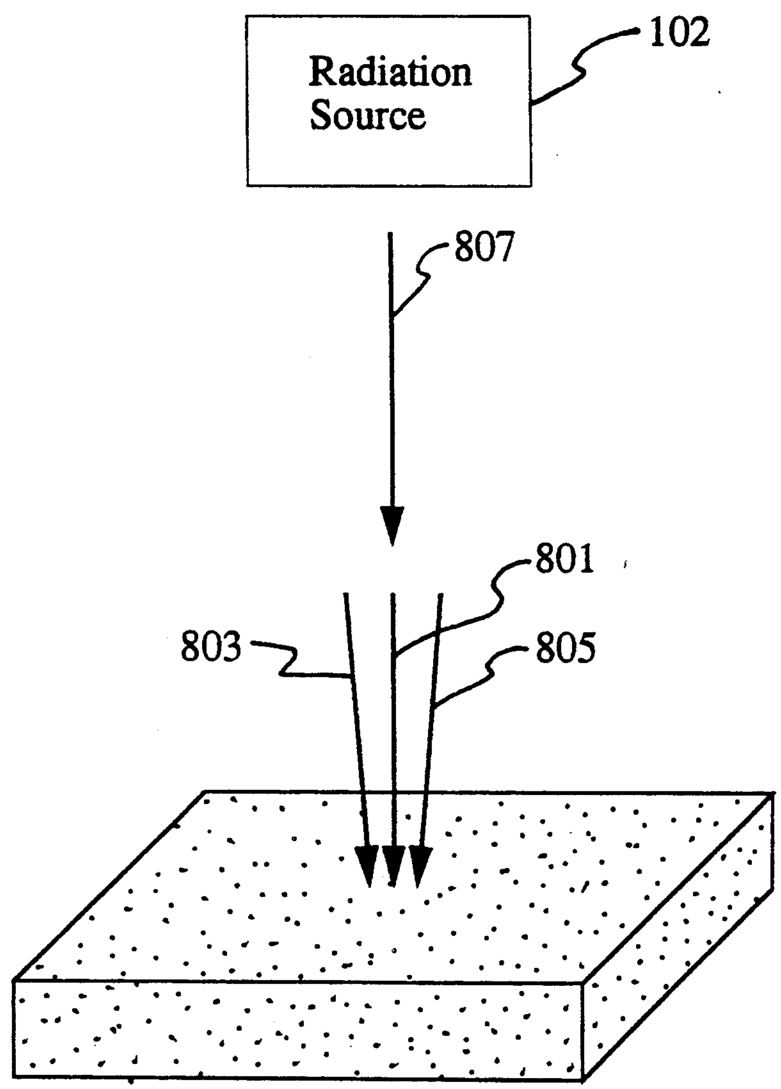
FIG. 8 is an illustration of the function of the all-optical switch as an optical logic gate.

FIG. 8 shows how the all-optical switch can also operate as an optical logic gate when biased by optical field 801 while input fields 803 and 805 are incident on the two-level systems simultaneously with bias field 801. All three optical fields are transient and coherent whose frequency is resonant or at least nearly resonant with the transition frequency of the two-level systems and whose duration is short compared to the induced dipole dephasing times of the two-level systems but is greater than $3h/8\pi^2\mu^2N$.

Denoting the variation of field strengths over one of the periodic inversion regions of FIG. 5 as $\delta$, let the peak field strength of the input fields 803 and 805 be either 0 or $\delta/2$. Then, FIG. 9 is a truth table for the logic gate when the peak field strength Eo of the bias field is $\zeta-3\delta/4$ indicating operation as an OR logic gate for the inversion, attenuating or amplifying a subsequent coherent optical field 807 which is resonant, or nearly resonant, with the dipole transition frequency. FIG. 10 is a truth table for the gate when the peak field strength $E_o$ of the bias field is $\delta-\zeta/4$ indicating operation as an NAND logic gate. Increasing the peak field strength of the bias field by $\zeta$ inverts the previous logic operations.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An all-optical switch having two possible states, said switch comprising a uniform distribution of a given density of multi-energy-level systems, said systems having a radiative transition from one energy level to a second energy level and being susceptible to transitioning from said one energy level to said second energy level, thereby causing said switch to go from one state to the other, in response to a transient, coherent optical pulse incident on said systems, said pulse having a carrier frequency that is at least nearly resonant with the transition frequency of said systems and a temporal duration that is shorter than the induced dipole dephasing time of said systems but longer than $3h/8\pi^2\mu^2N$.

2. An optical switch as set forth in claim 1, wherein said switch further comprises a host material, said material having embedded therein said multi-energy-level systems.

3. An optical switch as set forth in claim 2, wherein said density is at least $10^{16}$ said systems per $cm^3$ of volume.

4. An optical switch as set forth in claim 3, wherein said host material is cadmium sulfide and said systems are $I_2$ bound excitons.

* * * * *